(12) United States Patent
Nedorezov et al.

(10) Patent No.: US 9,592,832 B2
(45) Date of Patent: Mar. 14, 2017

(54) EXTENDING HYBRID ELECTRIC VEHICLE REGENERATIVE BRAKING

(71) Applicant: FORD GLOBAL TECHNOLOGIES, LLC, Dearborn, MI (US)

(72) Inventors: Felix Nedorezov, Rochester Hills, MI (US); Hong Jiang, Birmingham, MI (US); Zhengyu Dai, Canton, MI (US); Mark S. Yamazaki, Canton, MI (US); Daniel S. Colvin, Farmington Hills, MI (US)

(73) Assignee: FORD GLOBAL TECHNOLOGIE,S LLC, Dearborn, MI (US)

( * ) Notice: Subject to any disclaimer, the term of this patent is extended or adjusted under 35 U.S.C. 154(b) by 0 days.

(21) Appl. No.: 14/217,645

(22) Filed: Mar. 18, 2014

(65) Prior Publication Data

US 2015/0266481 A1    Sep. 24, 2015

(51) Int. Cl.
| | |
|---|---|
| *B60W 30/18* | (2012.01) |
| *F16H 57/04* | (2010.01) |
| *B60W 10/30* | (2006.01) |
| *B60K 6/48* | (2007.10) |
| *B60W 10/02* | (2006.01) |
| *B60W 10/196* | (2012.01) |
| *F16H 61/14* | (2006.01) |

(52) U.S. Cl.
CPC ......... *B60W 30/18127* (2013.01); *B60K 6/48* (2013.01); *B60W 10/026* (2013.01); *B60W 10/196* (2013.01); *B60W 10/30* (2013.01); *F16H 57/04* (2013.01); *B60K 2006/4825* (2013.01); *B60W 2510/0208* (2013.01); *B60W 2510/0241* (2013.01); *B60W 2710/18* (2013.01); *F16H 61/143* (2013.01); *Y02T 10/6221* (2013.01); *Y02T 10/6252* (2013.01)

(58) Field of Classification Search
None
See application file for complete search history.

(56) References Cited

U.S. PATENT DOCUMENTS

| | | | |
|---|---|---|---|
| 6,176,808 | B1 | 1/2001 | Brown et al. |
| 6,183,389 | B1 | 2/2001 | Tabata |
| 6,357,289 | B1 * | 3/2002 | Futawatari ................. 73/115.02 |
| 6,846,265 | B2 | 1/2005 | Yamamoto et al. |
| 6,945,905 | B2 | 9/2005 | Tamai et al. |
| 7,018,315 | B2 | 3/2006 | Endo et al. |
| 7,927,244 | B2 | 4/2011 | Iwanaka et al. |
| 8,162,084 | B2 | 4/2012 | Iwanaka et al. |
| 8,280,599 | B2 | 10/2012 | Suzuki et al. |
| 8,282,527 | B2 | 10/2012 | Suzuki et al. |
| 8,544,577 | B2 * | 10/2013 | Kitano et al. ............ 180/65.285 |

(Continued)

*Primary Examiner* — Ramya Burgess
*Assistant Examiner* — Timothy M Hannon
(74) *Attorney, Agent, or Firm* — David B. Kelley; MacMillan, Sobanski & Todd, LLC

(57) ABSTRACT

A method for controlling regenerative braking in a hybrid electric powertrain includes using an e-pump to supply fluid to a transmission provided an indication that a torque converter clutch disengagement will occur under current powertrain operating conditions is present, and discontinuing use of the e-pump and using a mechanical pump to supply fluid to the transmission provided the indication that a torque converter clutch disengagement will occur under current powertrain operating conditions is absent.

19 Claims, 3 Drawing Sheets

(56) References Cited

U.S. PATENT DOCUMENTS

| | | | |
|---|---|---|---|
| 8,825,347 B2* | 9/2014 | Yamada et al. | 701/112 |
| 2001/0000338 A1* | 4/2001 | IlJima | 477/62 |
| 2002/0107103 A1* | 8/2002 | Nakamori et al. | 475/116 |
| 2004/0144608 A1* | 7/2004 | Kobayashi et al. | 192/3.3 |
| 2008/0039281 A1 | 2/2008 | Okuda et al. | |
| 2008/0214354 A1* | 9/2008 | Dickinson | 477/57 |
| 2009/0105918 A1* | 4/2009 | Kobayashi et al. | 701/67 |
| 2010/0036574 A1* | 2/2010 | Hopp | 701/68 |
| 2010/0168969 A1* | 7/2010 | Inagaki et al. | 701/55 |
| 2011/0238248 A1 | 9/2011 | Suzuki et al. | |
| 2012/0290163 A1 | 11/2012 | Inagaki et al. | |
| 2013/0125995 A1 | 5/2013 | Long et al. | |

\* cited by examiner

EXTENDING HYBRID ELECTRIC VEHICLE REGENERATIVE BRAKING

BACKGROUND OF THE INVENTION

1. Field of the Invention

This invention relates generally to a method for increasing regenerative braking in a hybrid electric vehicle.

2. Description of the Prior Art

The fuel economy benefit in a hybrid electric vehicle results mainly from its ability to perform regenerative braking. In a hybrid electric powertrain an electric machine is coupled to the wheels through a torque converter and transmission gearing.

In the vehicle equipped with a modular hybrid transmission (MHT) and using a torque converter it is necessary to keep the torque converter bypass clutch locked during brake regeneration events. During such events an onboard electric machine is used as generator to recapture vehicle kinetic energy during braking.

Failure to keep the torque converter bypass clutch locked can result in the torque converter's impeller speed to rapidly decelerate to speeds where the transmission's mechanical pump can not operate efficiently. Such low speeds can result in loss of line pressure in the transmission's hydraulic system and loss of transmission clutch control.

Abandoning regenerative braking at higher speeds in anticipation of opening the torque converter bypass clutch results in kinetic energy that is not captured and thus in a reduced fuel economy benefit from regenerative braking.

In the previous solutions, regenerative braking is limited to the vehicle speeds and gears where the torque converter bypass clutch is sure to stay locked. During downshifts the amount of regenerative braking is limited to the level that would assure that torque converter bypass clutch slip is minimal. This also required a significant amount of blending, wherein torque smoothly transitions from reduced torque magnitudes to low negative regenerative torque magnitudes.

SUMMARY OF THE INVENTION

A method for controlling regenerative braking in a hybrid electric powertrain includes using an e-pump to supply fluid to a transmission provided an indication that a torque converter clutch disengagement will occur under current powertrain operating conditions is present, and discontinuing use of the e-pump and using a mechanical pump to supply fluid to the transmission provided the indication that a torque converter clutch disengagement will occur under current powertrain operating conditions is absent.

The method recovers more vehicle kinetic energy during regenerative braking events due to the torque converter bypass clutch being maintained locked by hydraulic pressure produced by the e-pump, which provides line pressure required by the transmission to maintain the clutch locked.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
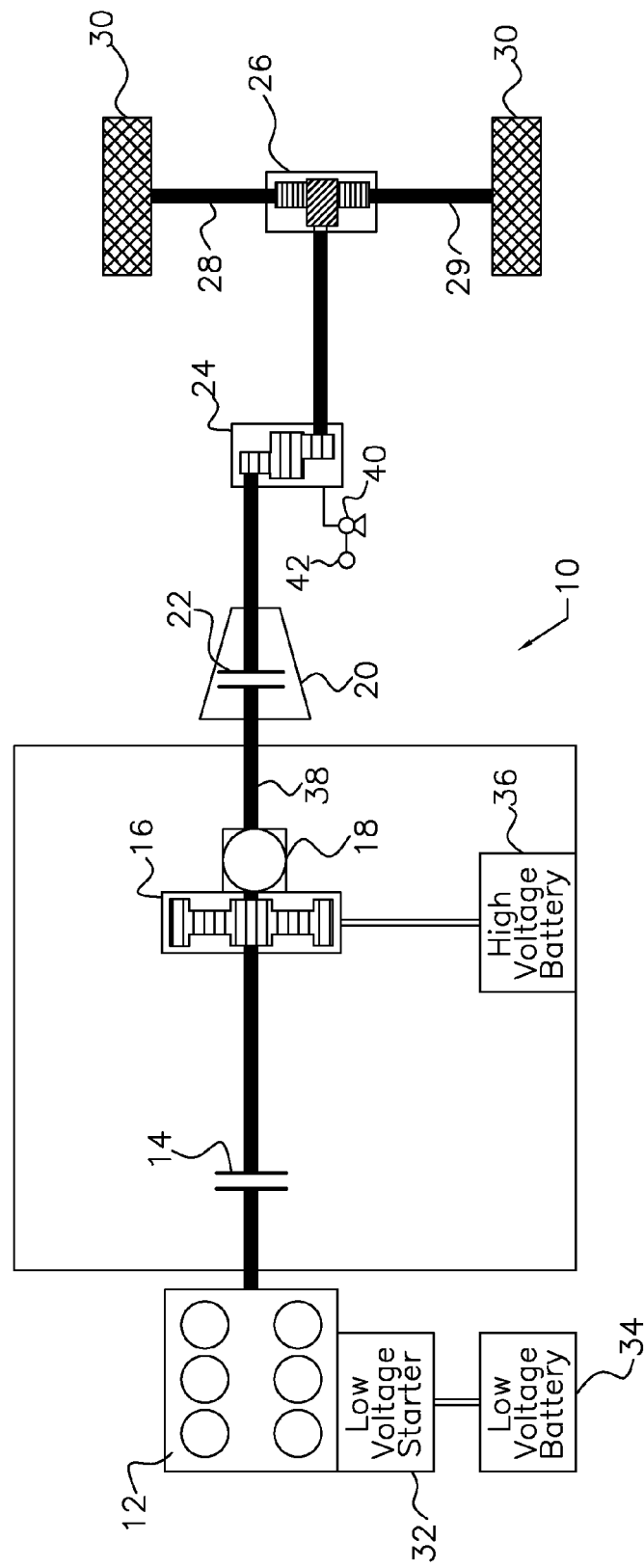
FIG. 1 is a schematic diagram showing a modular hybrid electric powertrain for a motor vehicle.

Referring first to FIG. 1, a hybrid electric powertrain 10 includes an internal combustion engine 12; engine disconnect clutch 14; electric machine or motor/generator 16; transmission hydraulic pump 18, i.e. a mechanical pump driven by the engine or electric machine or both of these; torque converter 20; torque converter lock-up clutch 22; transmission gearing 24; final drive gearing 26; shafts 28, 29; and driven wheels 30. A low voltage starter 32, powered by a low voltage battery 34, cranks the engine while starting the engine 12 and producing sustained combustion. A high voltage battery 36 powers the electric motor/generator 16.

The torque converter 20 is a hydraulic coupling that produces a hydrokinetic drive connection between an impeller, which is driveably connected to the engine 12 when clutch 14 is closed, and a turbine, which is driveably connected to the driven wheels 30.

The torque converter lock-up clutch 22 alternately opens and closes a drive connection between the torque converter's turbine and the shaft 38.

A vehicle equipped with this powertrain 10 can produce electric drive and hybrid electric drive and can charge the battery 36 either by regenerative braking, i.e., recovering and converting kinetic energy of the vehicle during a braking event to electric energy that can be stored in battery 36, or by using the engine to charge battery 36.

An electric pump (also referred to in the specification and claims as an e-pump) 40, i.e. a hydraulic pump driven by an electric motor 42 has its input connected to a source of hydraulic fluid at low pressure, such as the transmission's sump, and its output connected to the transmission hydraulic system, by which the torque converter's bypass clutch 22 is actuated between locked and unlocked states.

In powertrain 10 motor 16 is coupled to the wheels through the torque converter 20, transmission gearing 24 and final drive 26. The torque converter 20 transmits torque through the combination of the hydraulic path and the mechanic path, provided the torque converter clutch 22 is slipping. If the torque converter clutch 22 is fully open, torque can only be transmitted through the hydraulic path. If the clutch 22 is fully locked, the torque can only be transmitted through the mechanical path.

During regenerative braking, torque is transmitted from the wheels 30 to the electric machine 16. If clutch 22 is open, the torque converter's ability to transmit torque in the reverse direction is very limited. Any excessive regenerative torque can reduce the electric machine's speed. As a result, to recoup most of the kinetic energy using regenerative braking, the torque converter clutch 22 should be kept locked while the vehicle is slowing down.

The electric pump (e-pump) 40 provides an alternative source of hydraulic line pressure to the hydraulic pressure that is provided by mechanical pump 18. Line pressure produced by e-pump 40 is used to supplement or limit line pressure drop if mechanical oil pump 18 fails to supply adequate line pressure. The e-pump motor 42 is supplied with electric power from one of the batteries 34, 36.

Figure 2A:
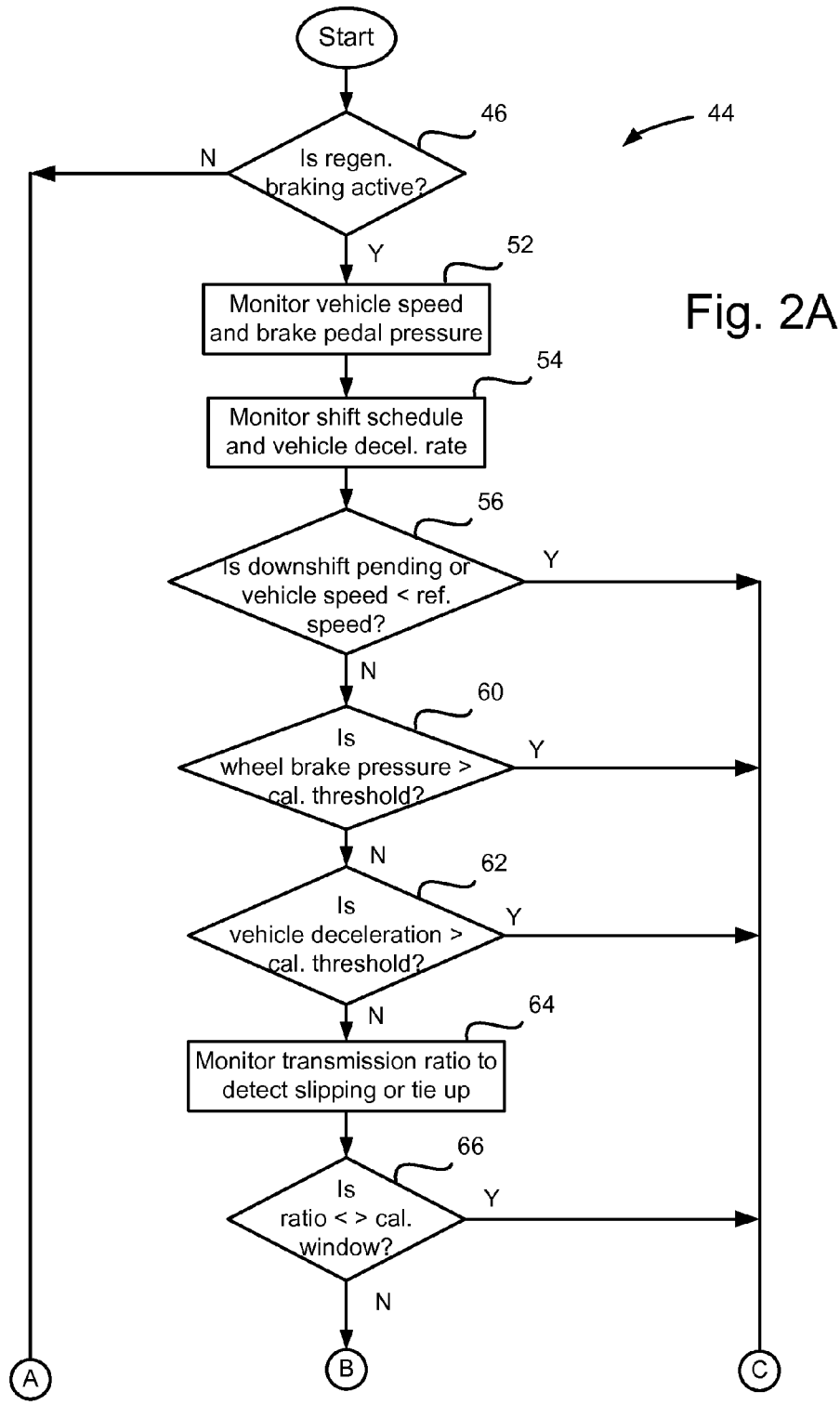
FIGS. 2A and 2B are a flow diagram representing an algorithm for coordinating transmission pressure with regenerative braking in the powertrain of FIG. 1.
Figure 2B:
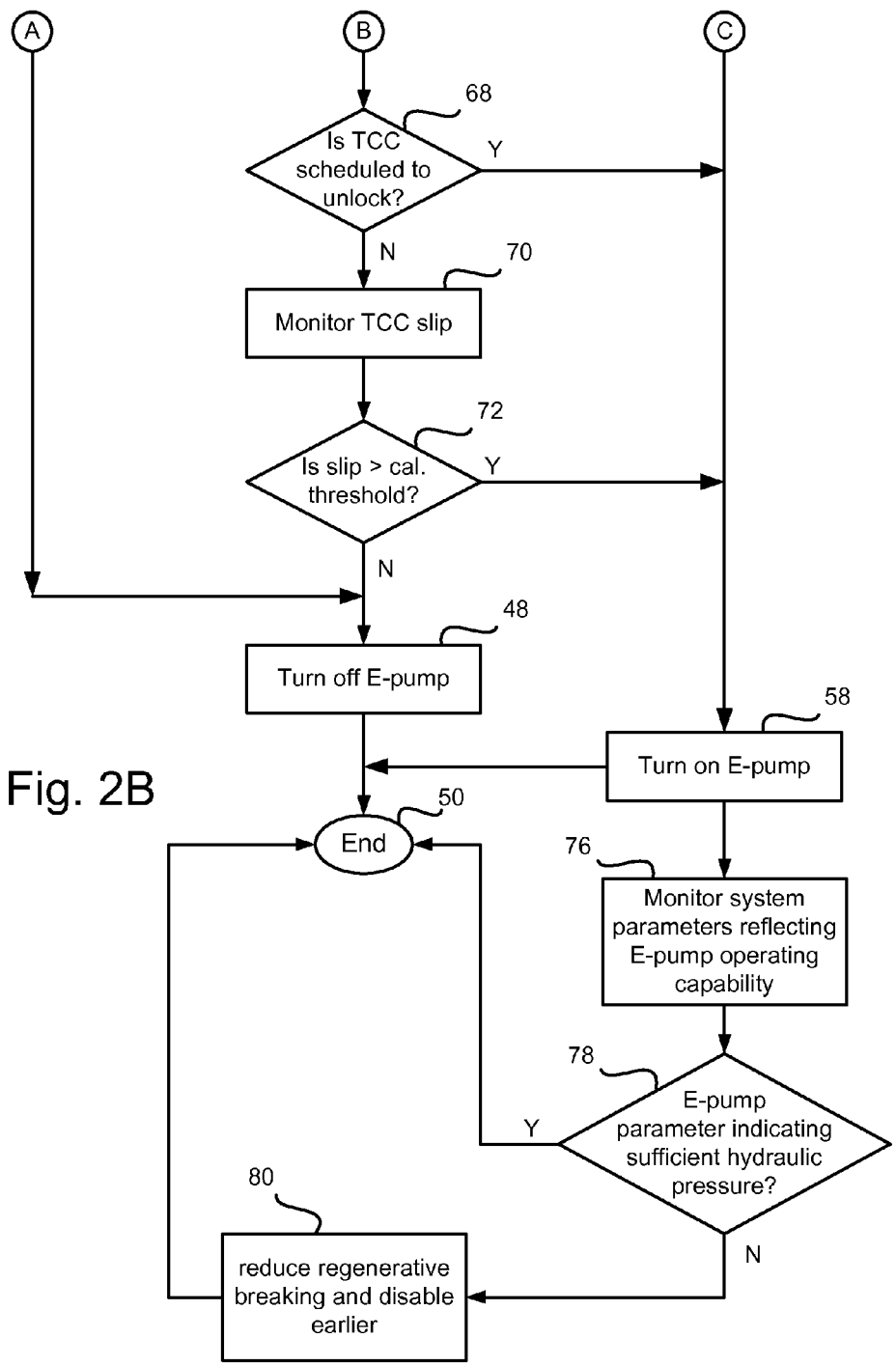

An algorithm 44 shown in FIGS. 2A and 2B controls and coordinates torque converter clutch operation and regenerative braking. At step 46 a test is performed to determine whether regenerative vehicle wheel braking is currently occurring. If the result of test 46 is logically false, control advances to step 48, where e-pump 40 is stopped and the control is terminated at step 50.

If the result of test 46 is logically true, at step 52 vehicle speed and brake pedal pressure are monitored, and at step 54 scheduled transmission gearshifts and vehicle deceleration rate are monitored.

At step 56 a test is performed to determine whether a transmission downshift is pending, i.e., commanded by not yet completed. Similarly at step 56 a test is performed to determine whether vehicle speed is less than a reference speed, which is a calibratable vehicle speed. If the result of test 56 indicates that a downshift is pending or that vehicle speed is less than the reference vehicle speed, control advances to step 58 where e-pump 40 is turned on to supply pressurized fluid to the transmission's hydraulic system.

But if the result of test 56 indicates that a downshift is not pending or that vehicle speed is greater than the reference vehicle speed, at step 60 a test is performed to determine whether brake pressure is greater than a reference brake pressure, which is a calibratable pressure magnitude. If the result of test 60 is true, control advances to step 58 where e-pump 40 is turned on to supply pressurized fluid to the transmission's hydraulic system.

If the result of test 60 is logically false, at step 62 a test is performed to determine whether vehicle deceleration is greater than a reference vehicle deceleration, which is a calibratable magnitude. If the result of test 62 is true, control advances to step 58 where e-pump 40 is turned on to supply pressurized fluid to the transmission's hydraulic system.

At step 64 the transmission speed ratio, torque ratio or gear ratio is monitored to detect slipping of a control element, i.e., a clutch or brake whose engagement is required to produce the current speed ratio, or a transmission tie-up, i.e., a condition wherein the engaged transmission control elements produce no transmission speed ratio.

At step 66 a test is performed to determine whether the current transmission speed ratio, torque ratio or gear ratio is outside of a calibratable range of speed ratios, or torque ratios or gear ratios, respectively. If the result of test 62 is true, control advances to step 58 where e-pump 40 is turned on to supply pressurized fluid to the transmission's hydraulic system.

If the result of test 66 is false, at step 68 a test is performed to determine whether the torque converter bypass clutch (TCC) 22 is scheduled to unlock. If the result of test 68 is true, control advances to step 58 where e-pump 40 is turned on to supply pressurized fluid to the transmission's hydraulic system.

If the result of test 68 is false, at step 70 slip across the torque converter bypass clutch (TCC) 22 is monitored.

At step 72 a test is performed to determine whether slip across the torque converter bypass clutch 22 is greater than a reference slip, which is a calibratable magnitude. If the result of test 72 is true, control advances to step 58 where e-pump 40 is turned on to supply pressurized fluid to the transmission's hydraulic system.

If the result of test 72 is false, at step 48 e-pump 40 is stopped and the control is terminated at step 50.

The control 44 monitors vehicle speed during a vehicle braking event. If regenerative braking is taking place during the braking event, the vehicle speed is compared to predicted vehicle speed to determine if the torque converter clutch 22 is likely to unlock. There are numerous reasons why torque converter could unlock including vehicle speed being too low, vehicle operator's depressing the brake pedal and producing high brake pressure resulting in rapid vehicle deceleration, slip across clutch 22 during regenerative braking downshifts, etc.

According to the control strategy, a transmission controller turns on e-pump 40 when there is a probability that impeller speed might not be sufficient to generate adequate line pressure. This could be done by monitoring brake pressure signal, torque converter slip, vehicle speed and other parameters affecting torque converter lock up state. To minimize wasting recoverable vehicle kinetic energy, the e-pump 40 should be activated only when a locked condition of the clutch 22 can not be ensured.

Alternatively transmission oil temperature, e-pump diagnostic signals, e-pump duty cycle, system voltage should be monitored, step 76, to determine if the e-pump is capable of providing a sufficient magnitude of transmission hydraulic pressure, step 78. If one of these parameters is restricting e-pump operation to the point where hydraulic pressure is not sufficient to maintain desired gear state, a signal is sent to a vehicle controller as an indication of this state. The vehicle controller then commands a reduced magnitude of regenerative braking and disables regenerative braking sooner to avoid loss of mechanical pump line pressure, step 80.

In accordance with the provisions of the patent statutes, the preferred embodiment has been described. However, it should be noted that the alternate embodiments can be practiced otherwise than as specifically illustrated and described.

The invention claimed is:

1. A method for controlling a hybrid electric powertrain, comprising:
   (a) while regenerative braking, using an e-pump to supply fluid to a transmission provided an indication that a torque converter clutch disengagement will occur under current powertrain operating conditions is present;
   (b) discontinuing use of the e-pump and using a mechanical pump to supply fluid to the transmission provided the indication that a torque converter clutch disengagement will occur under current powertrain operating conditions is absent.

2. The method of claim 1, wherein in step (a) said indication further comprises, while regenerative braking, using the e-pump to supply fluid to the transmission provided a current vehicle speed is less than a reference vehicle speed.

3. The method of claim 1, wherein in step (a) said indication further comprises, while regenerative braking, using the e-pump to supply fluid to the transmission provided a transmission downshift is pending.

4. The method of claim 1, wherein in step (a) said indication further comprises, while regenerative braking, using the e-pump to supply fluid to the transmission provided wheel brake pressure exceeds a reference wheel brake pressure.

5. The method of claim 1, wherein in step (a) said indication further comprises, while regenerative braking, using the e-pump to supply fluid to the transmission provided vehicle deceleration exceeds a reference vehicle deceleration.

6. The method of claim 1, wherein in step (a) said indication further comprises, while regenerative braking, using the e-pump to supply fluid to the transmission provided a current speed ratio produced by the transmission is greater than or less than a reference range of transmission ratios.

7. The method of claim 1, wherein in step (a) said indication further comprises a scheduled disengagement of the torque converter clutch.

8. The method of claim 1, wherein in step (a) said indication further comprises, while regenerative braking, using the e-pump to supply fluid to the transmission provided slip across the torque converter clutch is greater than a reference slip across the torque converter clutch.

9. The method of claim 1, further comprising:
(c) monitoring one of transmission oil temperature, e-pump diagnostic signals, e-pump duty cycle, and system voltage to determine if the e-pump is currently capable of providing a desired magnitude of hydraulic pressure to the transmission.

10. The method of claim 9, further comprising:
(d) reducing a magnitude of regenerative braking, provided the e-pump is currently incapable of providing the desired magnitude of hydraulic pressure to the transmission as indicated by one of transmission oil temperature, e-pump diagnostic signals, e-pump duty cycle, and system voltage.

11. A method for controlling a hybrid electric powertrain, comprising:
(a) during regenerative braking, turning off an e-pump and using a mechanical pump to supply fluid to a transmission provided a transmission downshift is not pending and a vehicle speed is not less than a reference speed;
(b) during regenerative braking, starting the e-pump to supply fluid to the transmission provided the transmission downshift is pending or the vehicle speed is less than the reference speed.

12. The method of claim 11 wherein:
step (a) further comprises turning off the e-pump provided the transmission downshift is not pending, the vehicle speed is not less than a reference speed, and a wheel brake pressure does not exceed a reference pressure;
step (b) further comprises turning on the e-pump provided the transmission downshift is pending, the vehicle speed is less than the reference speed, or the wheel brake pressure does not exceed the reference pressure.

13. The method of claim 11 wherein:
step (a) further comprises turning off the e-pump provided the transmission downshift is not pending, the vehicle speed is not less than a reference speed, and a vehicle deceleration does not exceed a reference deceleration;
step (b) further comprises turning on the e-pump provided the transmission downshift is pending, the vehicle speed is less than the reference speed, or the vehicle deceleration exceeds the reference deceleration.

14. The method of claim 11 wherein:
step (a) further comprises turning off the e-pump provided the transmission downshift is not pending, the vehicle speed is not less than a reference speed, and a slip across a torque converter clutch does not exceed a reference slip;
step (b) further comprises turning on the e-pump provided the transmission downshift is pending, the vehicle speed is less than the reference speed, or the slip across the torque converter clutch exceeds the reference slip.

15. The method of claim 11 further comprising:
(c) determining if the e-pump is currently capable of providing a desired magnitude of hydraulic pressure to the transmission;
(d) reducing a magnitude of regenerative braking, provided the e-pump is not currently capable of providing the desired magnitude of hydraulic pressure to the transmission.

16. A method for controlling a hybrid electric powertrain, comprising:
(a) during regenerative braking, turning off an e-pump and using a mechanical pump to supply fluid to a transmission provided a vehicle deceleration does not exceed a reference deceleration and a wheel brake pressure does not exceed a reference pressure;
(b) during regenerative braking, starting the e-pump to supply fluid to the transmission provided the vehicle deceleration exceeds the reference deceleration or the wheel brake pressure exceeds the reference pressure.

17. The method of claim 16 wherein:
step (a) further comprises turning off the e-pump provided the vehicle deceleration does not exceed the reference deceleration, a wheel brake pressure does not exceed a reference pressure, and a transmission downshift is not pending;
step (b) further comprises turning on the e-pump provided the vehicle deceleration exceeds the reference deceleration, the wheel brake pressure exceeds the reference pressure or the transmission downshift if pending.

18. The method of claim 16 wherein:
step (a) further comprises turning off the e-pump provided the vehicle deceleration does not exceed the reference deceleration, a wheel brake pressure does not exceed a reference pressure, and a vehicle speed is not less than a reference speed;
step (b) further comprises turning on the e-pump provided the vehicle deceleration exceeds the reference deceleration, the wheel brake pressure exceeds the reference pressure or the vehicle speed is less than the reference speed.

19. The method of claim 16 further comprising:
(c) determining if the e-pump is currently capable of providing a desired magnitude of hydraulic pressure to the transmission;
(d) reducing a magnitude of regenerative braking, provided the e-pump is not currently capable of providing the desired magnitude of hydraulic pressure to the transmission.

* * * * *